United States Patent
Andoh

(10) Patent No.: US 10,270,331 B2
(45) Date of Patent: Apr. 23, 2019

(54) POWER SUPPLY APPARATUS

(71) Applicant: Shohta Andoh, Kanagawa (JP)

(72) Inventor: Shohta Andoh, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 24 days.

(21) Appl. No.: 15/673,857

(22) Filed: Aug. 10, 2017

(65) Prior Publication Data

US 2018/0048224 A1    Feb. 15, 2018

(30) Foreign Application Priority Data

Aug. 15, 2016  (JP) .................................. 2016-159355

(51) Int. Cl.

| H02M 1/32 | (2007.01) |
|---|---|
| H02M 1/36 | (2007.01) |
| H02M 3/156 | (2006.01) |
| H02H 9/00 | (2006.01) |
| H02M 3/137 | (2006.01) |
| G05F 1/569 | (2006.01) |

(52) U.S. Cl.
CPC .............. *H02M 1/32* (2013.01); *H02H 9/001* (2013.01); *H02M 1/36* (2013.01); *H02M 3/156* (2013.01); *G05F 1/569* (2013.01); *H02M 3/137* (2013.01)

(58) Field of Classification Search
CPC .......... H02M 1/32; H02M 3/156; H02M 1/36; H02M 3/06; H02M 3/137; G05F 1/573; G05F 1/569; H02H 9/002; H02H 1/043
See application file for complete search history.

(56) References Cited

U.S. PATENT DOCUMENTS

| 2004/0090807 A1* | 5/2004 | Youm .................... H02M 7/219 363/132 |
|---|---|---|
| 2005/0057282 A1* | 3/2005 | Tsuchida .................. H04M 1/22 327/74 |
| 2009/0278516 A1* | 11/2009 | Bhagwat ............. H02M 3/1588 323/270 |
| 2010/0220539 A1* | 9/2010 | Huang .................... G11C 5/147 365/226 |
| 2011/0019316 A1* | 1/2011 | Zhan ........................ H02M 1/32 361/18 |
| 2012/0212986 A1* | 8/2012 | Minami ............... H02M 1/4208 363/126 |
| 2012/0262140 A1* | 10/2012 | Divan .................... H02M 3/156 323/282 |

(Continued)

FOREIGN PATENT DOCUMENTS

| JP | 7-023558 | 1/1995 |
| JP | 2015-142485 | 8/2015 |

*Primary Examiner* — Gary L Laxton
*Assistant Examiner* — Demetries A Gibson
(74) *Attorney, Agent, or Firm* — Duft & Bornsen, PC

(57) ABSTRACT

A power supply apparatus includes a boosting converter, an inrush current limiting element, a detection circuit, a switch element, and a control circuit. The inrush current limiting element is configured to limit an inrush current to the boosting converter. The detection circuit is configured to detect whether an output voltage of the boosting converter has reached a set voltage. The switch element is configured to short-circuit the inrush current limiting element. The control circuit is configured to operate the switch element according to the detection to short-circuit the inrush current limiting element.

4 Claims, 7 Drawing Sheets

(56) References Cited

U.S. PATENT DOCUMENTS

| | | | | |
|---|---|---|---|---|
| 2013/0257301 A1* | 10/2013 | Tran | ............... | C01B 13/115 315/200 R |
| 2013/0327754 A1* | 12/2013 | Salsich | ............ | B23K 9/124 219/137.71 |
| 2013/0334896 A1* | 12/2013 | Yamamoto | ......... | B60L 11/182 307/104 |

* cited by examiner

POWER SUPPLY APPARATUS

CROSS-REFERENCE TO RELATED APPLICATIONS

This patent application is based on and claims priority pursuant to 35 U.S.C. § 119(a) to Japanese Patent Application No. 2016-159355, filed on Aug. 15, 2016, in the Japan Patent Office, the entire disclosure of which is hereby incorporated by reference herein.

BACKGROUND

Technical Field

The present disclosure relates to a power supply apparatus.

Related Art

A power supply apparatus includes a current limiting element to suppress an inrush current that occurs at power-on. Since the current limiting element consumes power, it is desirable to short-circuit the current limiting element except when the inrush current occurs. Therefore, there is known a power supply apparatus including a switch element that short-circuits both ends of a current limiting element at the time other than the time of power-on.

In a case where an "instantaneous interruption" or an "instantaneous drop" occurs in the state where the current limiting element as described above is short-circuited, an inrush current that occurs when the power supply apparatus returns from the instantaneous interruption or the instantaneous drop cannot be suppressed by using the current limiting element. Herein, the "instantaneous interruption" is a phenomenon in which an input voltage becomes zero instantaneously. In addition, the "instantaneous drop" is a phenomenon in which the input voltage decreases instantaneously.

In addition, the above-described power supply apparatus cannot suppress inrush currents to a capacitor provided in an input stage or a direct current to direct current (DCDC) converter input stage. In order to suppress the inrush currents, a current limiting circuit is provided for each capacitor. In addition, since the current limiting element is short-circuited while a current is flowing through the current limiting element, a secondary inrush current cannot be suppressed.

SUMMARY

In an aspect of the present disclosure, there is provided a power supply apparatus that includes a boosting converter, an inrush current limiting element, a detection circuit, a switch element, and a control circuit. The inrush current limiting element is configured to limit an inrush current to the boosting converter. The detection circuit is configured to detect whether an output voltage of the boosting converter has reached a set voltage. The switch element is configured to short-circuit the inrush current limiting element. The control circuit is configured to operate the switch element according to the detection to short-circuit the inrush current limiting element.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
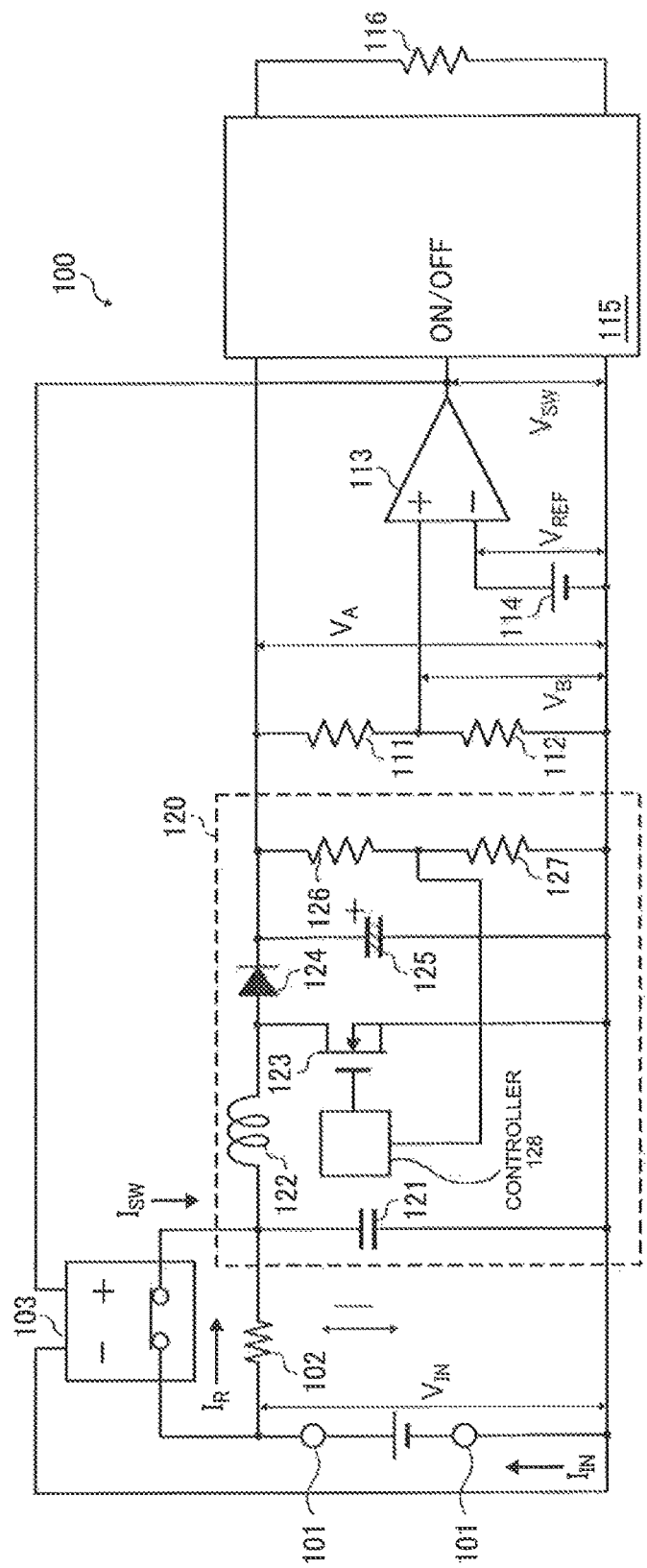
FIG. 1 is a circuit diagram illustrating a circuit configuration of a power supply apparatus according to a first embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

The present disclosure relates to a power supply apparatus. In the power supply apparatus according to an embodiment of the present disclosure, with one inrush current prevention circuit, it is possible to suppress an inrush current and a secondary inrush current that occur when the power supply apparatus is turned on and an inrush current that may occur at the time of return from the instantaneous interruption or the instantaneous drop.

In the inrush current prevention circuit included in the power supply apparatus according to the embodiment of the present disclosure, an inrush current limiting element is inserted into a main line. As a result, with one circuit, it is possible to limit various inrush currents (inrush current at power-on, and inrush current at the time of return from the instantaneous interruption or the instantaneous drop) that occur due to inflow of a current to a plurality of capacitors.

Specifically, when no current flows in the inrush current limiting element, the power supply apparatus according to the embodiment of the present disclosure short-circuits the inrush current limiting element, and suppresses the secondary inrush current first. Furthermore, the power supply apparatus according to the embodiment of the present disclosure detects the inrush current that occurs at the time of return from the instantaneous interruption or the instantaneous drop, and suppresses the inrush current and the secondary inrush current by the same sequence as a sequence performed at power-on.

Furthermore, the power supply apparatus according to the embodiment of the present disclosure short-circuits the switch element and turns on the DCDC converter after a smoothing capacitor is charged and a voltage difference in the inrush current element disappears following the power-on. By using such a sequence, it is possible to perform control such that no secondary inrush current occurs.

In addition, the power supply apparatus according to the embodiment of the present disclosure detects a decrease in a potential across a rectifying smoothing capacitor to detect an instantaneous interruption or an instantaneous drop and then open the switch element. By using such a sequence, it is possible to suppress the inrush current that can occur at the time of return from the instantaneous interruption or the instantaneous drop.

Furthermore, the power supply apparatus according to the embodiment of the present disclosure turns off the DCDC converter when the switch element is opened, as described above. Then, even after return from the instantaneous interruption or the instantaneous drop, the power supply apparatus short-circuits the switch element and turns on the DCDC converter after a potential difference across the inrush current limiting element disappears. By using such a sequence, the secondary inrush current that can occur after return from the instantaneous interruption or the instantaneous drop is suppressed. That is, with the power supply apparatus according to the embodiment of the present disclosure, it is possible to suppress various inrush currents exemplified above using one inrush current limiting circuit.

Figure 2:
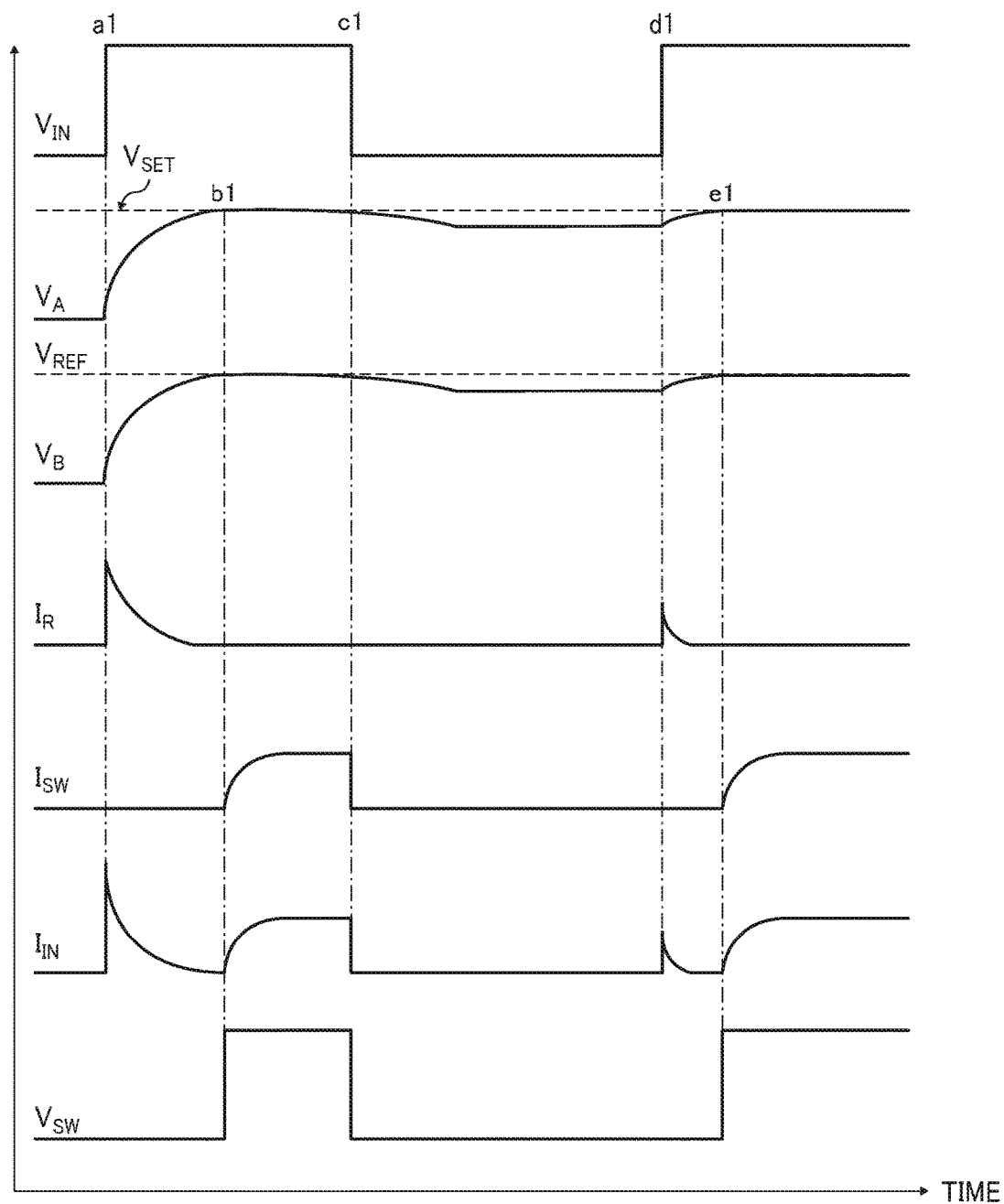
FIG. 2 is a timing chart for describing an operation sequence in the first embodiment.

Referring to the drawings, embodiments according to the above features will be described. FIG. 1 is a circuit diagram illustrating a power supply apparatus according to a first embodiment of the present disclosure. In addition, FIG. 2 is a timing chart for describing an operation sequence of the power supply apparatus 100 according to the first embodiment.

<Circuit Configuration in First Embodiment>

As illustrated in FIG. 1, the power supply apparatus 100 according to the present embodiment is configured as a boosting converter circuit. The power supply apparatus 100 includes an input terminal 101, an inrush current limiting element 102, and a switch element 103 that short-circuits the inrush current limiting element 102. In addition, the power supply apparatus 100 includes a boosting converter 120. The power supply apparatus 100 also includes a first output voltage dividing resistor 111 and a second output voltage dividing resistor 112 that divide an output voltage ($V_A$) of the boosting converter 120 to output a divided voltage ($V_B$), a comparator 113, and a reference voltage source 114.

In addition, the power supply apparatus 100 includes a DCDC converter 115, and a load 116 is coupled to the DCDC converter 115. Note that the switch element 103 is of a normally open type (A contact).

The boosting converter 120 includes an input capacitor 121, a coil 122, a switching element 123, a diode 124 for rectification, an output smoothing capacitor 125, a first voltage dividing resistor 126, a second voltage dividing resistor 127, and a controller 128.

The input capacitor 121 is used for reducing input noise. The voltage divided by a resistance ratio between the first voltage dividing resistor 126 and the second voltage dividing resistor 127 is input to the controller 128. The controller 128 performs feedback control in which a switching operation of the switching element 123 is controlled on the basis of an input voltage to boost the output voltage ($V_A$) of the boosting converter 120 so that the output voltage ($V_A$) reaches a set voltage ($V_{SET}$) that is set in advance. Note that the set voltage ($V_{SET}$) is appropriately set using a voltage value defined in advance.

In the power supply apparatus 100, a voltage dividing circuit includes the first output voltage dividing resistor 111 and the second output voltage dividing resistor 112. A detection circuit that detects whether the output voltage ($V_A$) has reached the set voltage ($V_{SET}$) includes this voltage dividing circuit, the comparator 113, and the reference voltage source 114.

In addition, a control circuit in the power supply apparatus 100 includes the comparator 113 and a circuit that inputs the output voltage (signal) of the comparator 113 to the switch element 103.

<Circuit Operation in First Embodiment>

Next, the operation and effects of the power supply apparatus 100 according to the present embodiment will be described. In FIG. 2, the horizontal axis represents passage of time. The vertical axis represents fluctuation of each voltage or each current described later. Note that a predetermined position on the vertical axis does not represent a specific concrete numerical value (voltage value or current value). A plurality of waveforms arranged along the vertical axis corresponds to voltages or currents corresponding to reference signs specified in FIG. 1.

Herein, referring to FIG. 1, reference signs used for respective waveforms illustrated in FIG. 2 will be described. $V_{IN}$ represents a power supply voltage applied to the input terminal 101 of the power supply apparatus 100. $V_A$ represents an output voltage of the boosting converter 120. $V_B$ represents the divided voltage of $V_A$.

$V_{REF}$ represents a reference voltage to compare with the output divided voltage $V_B$ of the boosting converter 120 and, by the comparison, to detect that the voltage $V_A$ has reached the set voltage $V_{SET}$. $I_R$ represents a current flowing through the inrush current limiting element 102.

$I_{SW}$ represents a current flowing through the switch element 103 that short-circuits the inrush current limiting element 102. $I_{IN}$ is an input current and corresponds to a current obtained by combining $I_R$ and $I_{SW}$. $V_{SW}$ represents a voltage that controls ON/OFF of the switch element 103 and the DCDC converter 115.

Next, each timing used in FIG. 2 will be described. Time point a1 corresponds to the moment of power-on. Time point b1 corresponds to the moment when the boosting converter 120 reaches the set voltage ($V_{SET}$). Time point c1 represents the moment when an instantaneous interruption or an instantaneous drop occurs in the power supply apparatus 100. Time point d1 corresponds to the moment when the power supply apparatus 100 returns from the instantaneous interruption or the instantaneous drop. Time point e1 corresponds to the moment when the boosting converter 120 reaches the set voltage after return from the instantaneous interruption or the instantaneous drop.

<Operation at Time Point a1 to Time Point b1>

Time from time point a1 to time point b1 corresponds to time from when the power supply apparatus 100 is turned on until the output voltage ($V_A$) of the boosting converter 120 reaches the set voltage ($V_{SET}$). In the power supply apparatus 100, the output voltage ($V_A$) of the boosting converter 120 is zero just before the power is turned on (before time point a1). Therefore, the divided voltage ($V_B$) of $V_A$ is also zero. When the divided voltage ($V_B$) is zero, the comparator 113 does not operate because there is no input to be compared, and a comparison output ($V_{SW}$) corresponding to the output of the comparator 113 becomes zero. When the comparison output ($V_{SW}$) is zero, the switch element 103 does not operate. Therefore, a contact of the switch element 103 remains open. In addition, the DCDC converter 115 is also off.

Since the switch element 103 remains off at power-on (time point a1), the input current ($I_{IN}$) passes through the inrush current limiting element 102 from the input terminal 101 and charges the input capacitor 121 of the boosting converter 120. In addition, the input current ($I_{IN}$) passes through the inrush current limiting element 102, the coil 122, and the diode 124, and charges the output smoothing capacitor 125 of the boosting converter 120.

The inrush current that occurs at the time of this current application (time point a1) is suppressed by the inrush current limiting element 102. From time point a1 to time point b1, the output voltage ($V_A$) of the boosting converter 120 increases while the input current ($I_{IN}$) decreases. When time reaches time point b1, the output voltage ($V_A$) reaches the set voltage ($V_{SET}$) and becomes a constant value. At the same time, charging of the output smoothing capacitor 125 is completed and the input current ($I_{IN}$) becomes zero.

<Operation at Time Point b1 to Time Point c1>

Time from time point b1 to time point c1 corresponds to time from when the output voltage ($V_A$) of the boosting converter 120 of the power supply apparatus 100 reaches the set voltage ($V_{SET}$) until the power supply apparatus 100 goes into steady operation. The values of the first output voltage dividing resistor 111, the second output voltage dividing resistor 112, and the reference voltage source 114 are set in advance such that when the output voltage ($V_A$) of the boosting converter 120 reaches the set voltage ($V_{SET}$), the divided voltage ($V_B$) becomes equal to the reference voltage ($V_{REF}$) supplied by the reference voltage source 114. As a result, it is possible, by the comparison output ($V_{SW}$) that is an output of the comparator 113, to detect that the output voltage ($V_A$) of the boosting converter 120 has reached the set voltage ($V_{SET}$).

When the divided voltage ($V_B$) exceeds the reference voltage ($V_{REF}$), the comparison output ($V_{SW}$) that is the output of the comparator 113 becomes a Hi level. When the comparison output ($V_{SW}$) becomes the Hi level, the switch element 103 and the DCDC converter 115 are turned on. That is, when the output voltage ($V_A$) of the boosting converter 120 reaches the set voltage ($V_{SET}$), the reaching can be detected by the level of the comparison output ($V_{SW}$) that is the output of the comparator 113.

When the comparison output ($V_{SW}$) becomes the Hi level, the switch element 103 operates to close the contact. In addition, the DCDC converter 115 is turned on, and power supply to the load 116 is started.

Since the output voltage ($V_A$) of the boosting converter 120 has reached the set voltage ($V_{SET}$) when the switch element 103 operates, the boosting converter 120 stops operating, and the DCDC converter 115 is off just before time point b1. Therefore, the current ($I_R$) flowing through the inrush current limiting element 102 is zero. Therefore, even if the switch element 103 is short-circuited, no secondary inrush current occurs in the power supply apparatus 100.

In addition, when the DCDC converter 115 is turned on, the DCDC converter 115 starts drawing a current. As a result, the input current ($I_{IN}$) gradually increases and the power supply apparatus 100 goes into steady operation. Since the switch element 103 is on (the contact is closed and the inrush current limiting element 102 is short-circuited) in steady operation, the input current ($I_{IN}$) is equal to the current ($I_{SW}$) flowing through the switch element 103 ($I_{IN}=I_{SW}$). In addition, the current ($I_R$) flowing through the inrush current limiting element 102 is zero ($I_R=0$). Therefore, in steady operation, the inrush current limiting element 102 does not consume power in the power supply apparatus 100.

<Operation at Time Point c1 to Time Point d1>

Time from time point c1 to time point d1 corresponds to time from the occurrence of an instantaneous interruption or an instantaneous drop in the power supply apparatus 100 until the power supply apparatus 100 returns from the instantaneous interruption or the instantaneous drop. Note that the "instantaneous interruption" is a phenomenon in which the power supply voltage ($V_{IN}$) that is the input voltage becomes zero instantaneously. In addition, the "instantaneous drop" is a phenomenon in which the power supply voltage ($V_{IN}$) that is the input voltage decreases instantaneously.

Even if the instantaneous interruption or the instantaneous drop occurs, the DCDC converter 115 draws a current for supplying power to the load 116. Therefore, the boosting converter 120 supplies power to the DCDC converter 115 while power supply from the input terminal 101 is insufficient. At this time, since the output voltage ($V_A$) of the boosting converter 120 has decreased, the divided voltage ($V_B$) is naturally lower than the reference voltage ($V_{REF}$). As a result, the comparison output ($V_{SW}$) from the comparator 113 becomes a Low level. When the comparison output ($V_{SW}$) becomes the Low level, the switch element 103 and the DCDC converter 115 are turned off. As a result, the contact of the switch element 103 is opened and therefore the inrush current limiting element 102 is no longer in a short-circuit state.

<Operation at Time Point d1 to Time Point e1>

Time from time point d1 to time point e1 corresponds to time from when the power supply apparatus 100 returns from the instantaneous interruption or the instantaneous drop that has occurred until the output voltage ($V_A$) of the boosting converter 120 returns to the set voltage ($V_{SET}$). The divided voltage ($V_B$) with respect to the output voltage ($V_A$) of the boosting converter 120 remains lower than the reference voltage ($V_{REF}$) at the time of return from the instantaneous interruption or the instantaneous drop (time point d1). Therefore, the comparison output ($V_{SW}$) from the comparator 113 is at the Low level, and the switch element 103 remains off.

The input current ($I_{IN}$) when the switch element 103 is off charges the input capacitor 121 from the input terminal 101 via the inrush current limiting element 102. In addition, the input current ($I_{IN}$) charges the output smoothing capacitor 125 via the inrush current limiting element 102, the coil 122, and the diode 124. At this time, the inrush current limiting element 102 suppresses the inrush current that occurs at the time of return from the instantaneous interruption and the instantaneous drop. Thereafter, when the output voltage ($V_A$) of the boosting converter 120 reaches the set voltage ($V_{SET}$), charging of the output smoothing capacitor 125 is completed. This cycle is the same operation as the operation when the power supply apparatus 100 is turned on (time point a1).

<Operation after Time Point e1>

Time after time point e1 corresponds to time from when the output voltage ($V_A$) of the boosting converter 120 reaches the set voltage ($V_{SET}$) until the power supply apparatus 100 goes into the steady operation after the instantaneous interruption or the instantaneous drop occurs.

The comparator 113 compares the divided voltage ($V_B$) obtained by dividing the output voltage ($V_A$) of the boosting converter 120 by the first output voltage dividing resistor 111 and the second output voltage dividing resistor 112 with the reference voltage ($V_{REF}$). As described above, each circuit element of the power supply apparatus 100 is set such that the divided voltage ($V_B$) when the output voltage ($V_A$) reaches the set voltage ($V_{SET}$) is equal to the reference voltage ($V_{REF}$). Therefore, when the divided voltage ($V_B$) of the boosting converter 120 exceeds the reference voltage ($V_{REF}$), the exceedance means that the output voltage ($V_A$) is the set voltage ($V_{SET}$).

Since the comparison output ($V_{SW}$) of the comparator 113 at this time is at the Hi level, the switch element 103 and the DCDC converter 115 are turned on. When the switch element 103 is turned on, the inrush current limiting element 102 is short-circuited.

At this time, a charging current of the output smoothing capacitor 125 is zero and the DCDC converter 115 is also off. Therefore, the current ($I_R$) flowing through the inrush current limiting element 102 is zero. Therefore, a secondary inrush current that occurs when the switch element 103 is short-circuited does not occur at all.

After this, the DCDC converter 115 is turned on and starts drawing a current. As a result, the input current ($I_{IN}$) gradually increases and the power supply apparatus 100 goes into the steady operation. Since the switch element 103 is on in steady operation, the input current ($I_{IN}$) is equal to the current ($I_{SW}$) flowing through the switch element 103 ($I_{IN}=I_{SW}$). In addition, the current ($I_R$) flowing through the inrush current limiting element 102 becomes zero (IR=0). Therefore, there is no power consumption in the inrush current limiting element 102, and power loss by the inrush current limiting element 102 does not occur in steady operation.

As described above, in order to suppress various types of inrush currents, the power supply apparatus 100 according to the present embodiment short-circuits the inrush current limiting element 102 when no current flows in the inrush current limiting element 102, and suppresses a secondary inrush current while reducing unnecessary power consumption. Furthermore, the power supply apparatus 100 detects the inrush current that occurs at the time of return from the instantaneous interruption or the instantaneous drop, and suppresses the inrush current and the secondary inrush current by the same sequence as a sequence performed at power-on. That is, the power supply apparatus 100 includes one inrush current limiting circuit that includes the first output voltage dividing resistor 111, the second output voltage dividing resistor 112, the comparator 113, the reference voltage source 114, and the switch element 103. With this inrush current limiting circuit, various inrush currents can be suppressed.

<Circuit Configuration in Second Embodiment>

Figure 3:
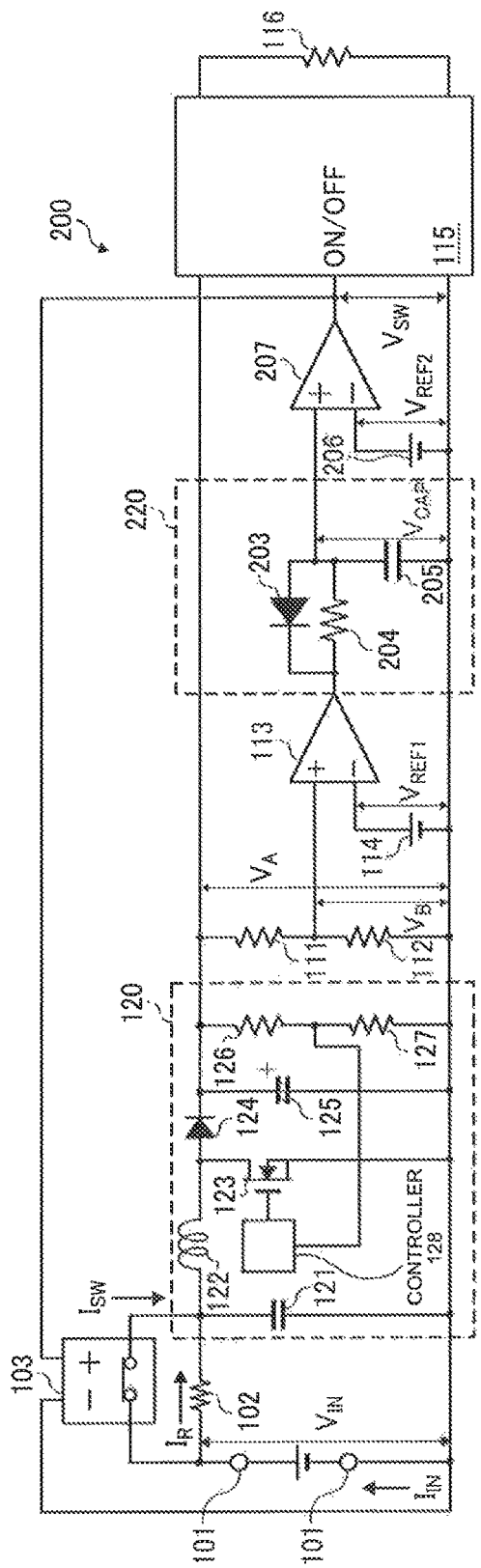
FIG. 3 is a circuit diagram illustrating a circuit configuration of a power supply apparatus according to a second embodiment of the present invention.
Figure 4:
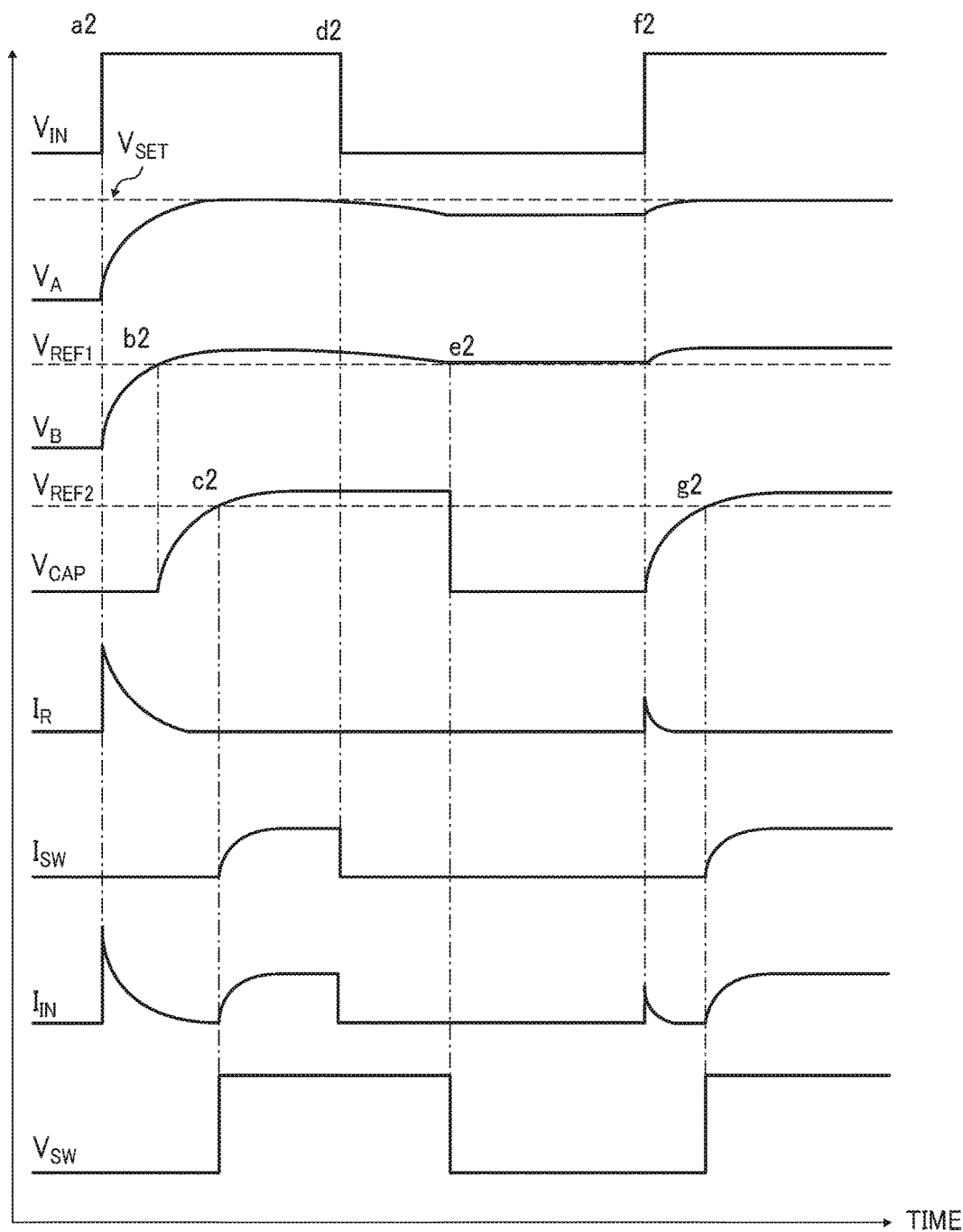
FIG. 4 is a timing chart for describing an operation sequence in the second embodiment.

Next, a power supply apparatus according to another embodiment of the present disclosure will be described with reference to FIGS. 3 and 4. FIG. 3 is a circuit diagram illustrating the power supply apparatus according to the second embodiment of the present disclosure. In addition, FIG. 4 is a timing chart for describing an operation sequence of the power supply apparatus 200 according to the second embodiment.

Note that in the following description, the same configurations as the configurations described in the first embodiment are denoted by the same reference signs, and detailed description of some of the configurations will be omitted. The power supply apparatus 200 according to the present embodiment includes the following configurations similarly to the power supply apparatus 100 according to the first embodiment.

That is, the power supply apparatus 200 includes an input terminal 101, an inrush current limiting element 102, a switch element 103, a boosting converter 120, a first output voltage dividing resistor 111 and a second output voltage dividing resistor 112, a comparator 113, a reference voltage source 114, and a DCDC converter 115.

In addition to the above configuration, the power supply apparatus 200 further includes a delay circuit 220 that controls an output timing of a signal output when an increase and a decrease in an output voltage ($V_A$) of the boosting converter 120 are detected, a second reference voltage source 206, and a second comparator 207.

The delay circuit 220 is a circuit that generates a delay after detecting an increase in the output voltage ($V_A$) to output a signal, and then outputs a signal without giving a delay after detecting a decrease in the output voltage ($V_A$). The delay circuit 220 includes a time constant resistor 204, a time constant capacitor 205, and a capacitor discharging diode 203.

According to the power supply apparatus 100 according to the first embodiment, the comparator 113 compares the reference voltage ($V_{REF}$) with the divided voltage ($V_B$), and by the comparison, detects that the output voltage ($V_A$) of the boosting converter 120 has reached the set voltage ($V_{SET}$). In view of an actual circuit, an error may occur because of the setting accuracy of the set voltage ($V_{SET}$) due to a variation in characteristics of the circuit elements (the first output voltage dividing resistor 111 and the second output voltage dividing resistor 112) and the accuracy of the reference voltage ($V_{REF}$).

Figure 7:
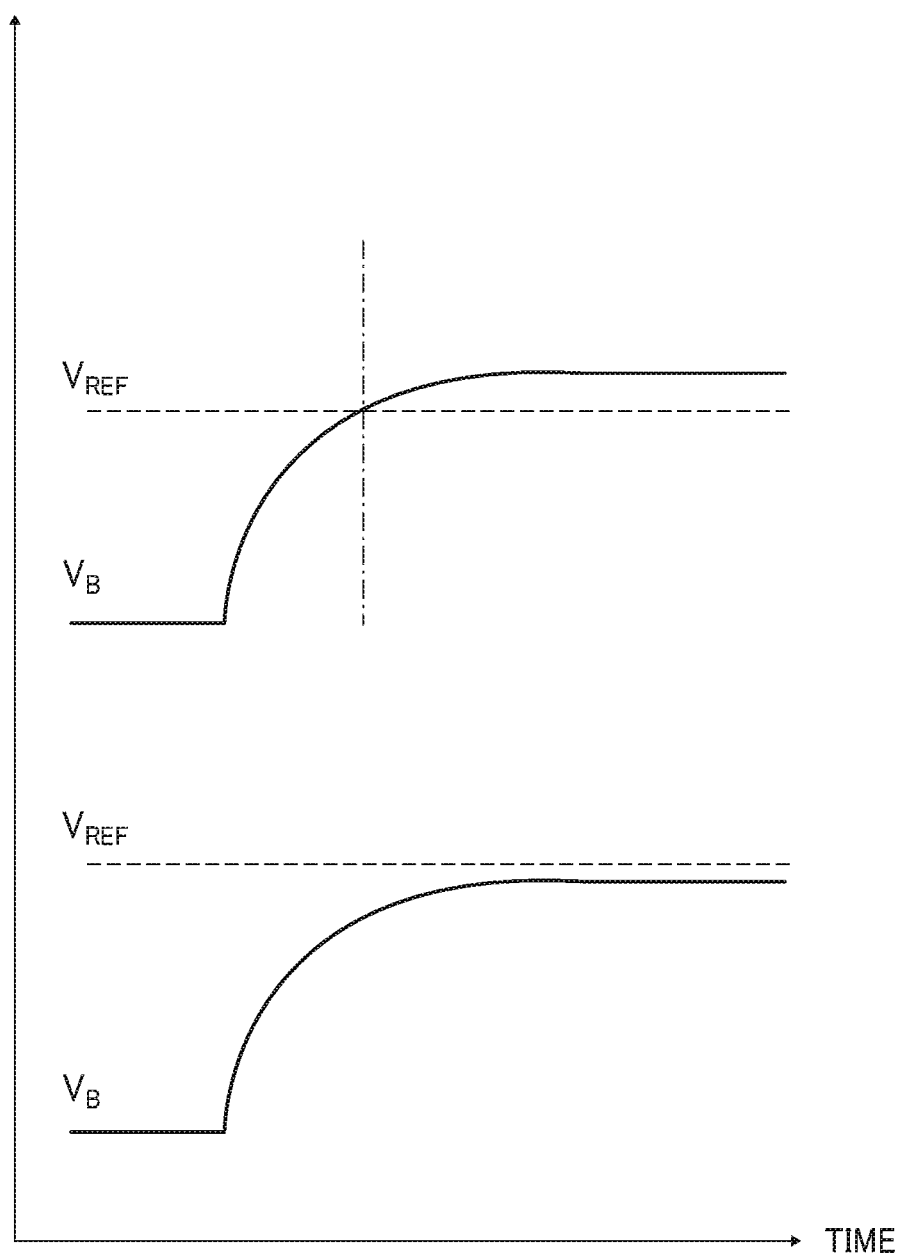
FIG. 7 is a chart for describing a challenge of the power supply apparatus according to the first embodiment.

Therefore, as illustrated in FIG. 7, with the configuration of the power supply apparatus 100 according to the first embodiment alone, there is a case where detection is performed before the set voltage ($V_{SET}$) is reached or a case where detection is not performed even when the set voltage ($V_{SET}$) is reached. There is room for contrivance to further improve the accuracy of operation.

Accordingly, in the power supply apparatus 200, the first output voltage dividing resistor 111, the second output voltage dividing resistor 112, and the reference voltage source 114 are set such that an increase in the output voltage ($V_A$) of the boosting converter 120 is detected before the output voltage ($V_A$) reaches the set voltage ($V_{SET}$).

Furthermore, in the power supply apparatus 200, after the increase in the output voltage ($V_A$) is detected, a delay taking into consideration real time until the output voltage ($V_A$) reaches the set voltage ($V_{SET}$) is given. After the output voltage ($V_A$) reaches the set voltage ($V_{SET}$), the switch element 103 and the DCDC converter 115 are turned on. Control is performed such that such operation is performed.

In the power supply apparatus 200, a voltage dividing circuit includes the first output voltage dividing resistor 111 and the second output voltage dividing resistor 112. A detection circuit that detects whether the output voltage ($V_A$) has reached the set voltage ($V_{SET}$) includes the voltage dividing circuit, the comparator 113, the delay circuit 220, the reference voltage source 114, the second comparator 207, and the second reference voltage source 206.

In addition, a control circuit in the power supply apparatus 200 includes the delay circuit 220, the second comparator 207, and the circuit that inputs the output voltage (signal) of the second comparator 207 to the switch element 103.

<Circuit Operation in Second Embodiment>

Next, the operation and effects of the power supply apparatus 200 according to the present embodiment will be described. In FIG. 4, the horizontal axis represents passage of time. The vertical axis represents fluctuation of each voltage or each current described later. In FIG. 4, as in FIG. 2, a predetermined position on the vertical axis does not represent a specific concrete numerical value (voltage value or current value). A plurality of waveforms arranged along the vertical axis corresponds to voltages or currents corresponding to reference signs specified in FIG. 3.

In FIG. 4, the present embodiment is similar to the first embodiment with respect to a power supply voltage ($V_{IN}$), the output voltage ($V_A$) of the boosting converter 120, the divided voltage ($V_B$), a current ($I_R$) flowing through the inrush current limiting element 102, an input current ($I_{IN}$), a composite current of $I_R$ and $I_{IN}$ ($I_{SW}$), and a comparison output ($V_{SW}$).

In the present embodiment, a reference voltage input to the comparator 113 is a first reference voltage ($V_{REF1}$). The comparator 113 outputs a signal, obtained by detecting that the output voltage ($V_A$) of the boosting converter 120 has reached the set voltage ($V_{SET}$), on the basis of a comparison with the first reference voltage ($V_{REF1}$).

As for reference signs of the voltages and the currents according to the present embodiment, $V_{CAP}$ represents a voltage across the time constant capacitor 205. $V_{REF2}$ represents a second reference voltage to detect the increase in the output voltage ($V_A$) by comparison with $V_{CAP}$.

Next, each timing used in FIG. 4 will be described. Time point a2 corresponds to the moment of power-on. Time point b2 corresponds to the moment when the boosting converter 120 reaches the first reference voltage ($V_{REF1}$). Time point c2 corresponds to the moment when the voltage across the time constant capacitor 205 ($V_{CAP}$) reaches the second reference voltage ($V_{REF2}$). Time point d2 corresponds to the moment when an instantaneous interruption or an instantaneous drop occurs in the power supply apparatus 200.

Time point e2 corresponds to the moment when the divided voltage ($V_B$) of the output voltage ($V_A$) of the boosting converter 120 falls below the first reference voltage ($V_{REF1}$). Time point f2 corresponds to the moment when the power supply apparatus 200 returns from the instantaneous interruption or the instantaneous drop. Time point g2 corresponds to the moment when the voltage across the time constant capacitor 205 ($V_{CAP}$) reaches the second reference voltage ($V_{REF2}$) after return from the instantaneous interruption or the instantaneous drop.

<Operation at Time Point a2 to Time Point b2>

Time from time point a2 to time point b2 corresponds to time from when the power supply apparatus 200 is turned on until the output voltage ($V_A$) of the boosting converter 120 reaches the set voltage ($V_{SET}$). In the power supply apparatus 200, the output voltage ($V_A$) of the boosting converter 120 is zero just before the power is turned on (before time point a2). Therefore, the divided voltage ($V_B$) of $V_A$ is also zero. When the divided voltage ($V_B$) is zero, the comparator 113 does not operate because there is no input to be compared, and an output of the comparator 113 becomes zero. In this case, since the comparison output ($V_{SW}$) that is an output of the second comparator 207 also becomes zero, the switch element 103 does not operate. Therefore, a contact of the switch element 103 remains open. In addition, the DCDC converter 115 is also off.

Since the switch element 103 remains off at power-on (time point a2), the input current ($I_{IN}$) passes through the inrush current limiting element 102 from the input terminal 101 and charges the input capacitor 121 of the boosting converter 120. In addition, the input current ($I_{IN}$) passes through the inrush current limiting element 102, the coil 122, and the diode 124, and charges the output smoothing capacitor 125 of the boosting converter 120.

The inrush current that occurs at the time of this current application (time point a2) is suppressed by the inrush current limiting element 102. From time point a2 to Time point b2, the output voltage ($V_A$) of the boosting converter 120 increases while the input current ($I_{IN}$) decreases. When time reaches time point b2, the output voltage ($V_A$) reaches the set voltage ($V_{SET}$) and the divided voltage ($V_B$) reaches the first reference voltage ($V_{REF1}$). At the same time, charging of the output smoothing capacitor 125 is completed and the input current ($I_{IN}$) becomes zero.

<Operation at Time Point b2 to Time Point c2>

Time from time point b2 to time point c2 corresponds to a period for giving a constant delay after the divided voltage ($V_B$) of the output voltage ($V_A$) of the boosting converter 120 reaches the first reference voltage ($V_{REF1}$). When the divided voltage ($V_B$) exceeds the first reference voltage ($V_{REF1}$), the output of the comparator 113 becomes the Hi level. An output current from the comparator 113 passes through the time constant resistor 204 and charges the time constant capacitor 205 over time. When the voltage across the charged time constant capacitor 205 ($V_{CAP}$) exceeds the second reference voltage ($V_{REF2}$), the output of the second comparator 207 becomes the Hi level.

By ensuring this period sufficiently in accordance with the actual circuit operation, it is possible to operate the second comparator 207 after the output voltage ($V_A$) of the boosting converter 120 has reached the set voltage ($V_{SET}$), that is, after the charging of the output smoothing capacitor 125 is completed.

<Operation at Time Point c2 to Time Point d2>

Time from time point c2 to time point d2 corresponds to time from the operation of the second comparator 207 until the power supply apparatus 200 goes into steady operation as described above. By sufficiently taking the delay period already described, the comparison output ($V_{SW}$) that is the output of the second comparator 207 is set to Hi level after the output voltage ($V_A$) reaches the set voltage ($V_{SET}$). When the comparison output ($V_{SW}$) becomes the Hi level, the switch element 103 and the DCDC converter 115 are turned on.

At this time, since the output voltage ($V_A$) of the boosting converter 120 has reached the set voltage ($V_{SET}$), a charging current of the output smoothing capacitor 125 is zero. In addition, since the DCDC converter 115 is off until just before, the current flowing through the inrush current limiting element 102 is zero. Therefore, a secondary inrush current that occurs when the inrush current limiting element 102 is short-circuited by the switch element 103 does not occur at all.

After the above, the DCDC converter 115 gradually starts drawing a current. Therefore, the input current ($I_{IN}$) gradually increases and the power supply apparatus 200 goes into steady operation. Since the switch element 103 is on (the contact is closed and the inrush current limiting element 102 is short-circuited) in steady operation, the input current ($I_{IN}$) is equal to the current ($I_{SW}$) flowing through the switch element 103 ($I_{IN}=I_{SW}$). In addition, the current ($I_R$) flowing through the inrush current limiting element 102 is zero ($I_R=0$). Therefore, in steady operation, the inrush current limiting element 102 does not consume power in the power supply apparatus 200.

<Operation at Time Point d2 to Time Point e2>

Time from time point d2 to time point e2 is a period from when the instantaneous interruption or the instantaneous drop occurs in the power supply apparatus 200 until the output voltage ($V_A$) of the boosting converter 120 decreases and the divided voltage ($V_B$) falls below the first reference voltage ($V_{REF1}$). Even if the instantaneous interruption or the instantaneous drop occurs, the DCDC converter 115 draws a current for supplying power to the load 116. Therefore, the boosting converter 120 supplies power to the DCDC converter 115 while power supply from the input terminal 101 is insufficient. At this time, since the output voltage ($V_A$) of the boosting converter 120 has decreased, the divided voltage ($V_B$) naturally becomes lower than the first reference voltage ($V_{REF1}$).

<Operation at Time Point e2 to Time Point f2>

Time from time point e2 to time point f2 corresponds to time from when the divided voltage ($V_B$) falls below the first reference voltage ($V_{REF1}$) until the power supply apparatus 200 returns from the instantaneous interruption or the instantaneous drop. In the power supply apparatus 200, when the divided voltage ($V_B$) falls below the first reference voltage ($V_{REF1}$), the comparator 113 stops outputting. When the output of the comparator 113 stops, the time constant capacitor 205 is instantaneously discharged via the capacitor discharging diode 203. Then, since the voltage across the time constant capacitor 205 ($V_{CAP}$) becomes zero, the comparison output ($V_{SW}$) that is the output of the second comparator 207 becomes the Low level. When the comparison output ($V_{SW}$) becomes the Low level, the switch element 103 and the DCDC converter 115 are turned off. As a result, the contact of the switch element 103 is opened and therefore the inrush current limiting element 102 is no longer in a short-circuit state.

<Operation at Time Point f2 to Time Point g2>

Time from time point f2 to time point g2 is a period for giving a constant delay after return from the instantaneous interruption/instantaneous drop. After return from the instantaneous interruption/instantaneous drop, the divided voltage ($V_B$) exceeds the first reference voltage ($V_{REF1}$). Therefore, the output of the comparator 113 becomes the Hi level. At this time, the output current of the comparator 113 charges the time constant capacitor 205 over time via the time constant resistor 204. As a result, when the voltage across the time constant capacitor 205 ($V_{CAP}$) exceeds the second reference voltage ($V_{REF2}$), the comparison output ($V_{SW}$) that is the output of the second comparator 207 becomes the Hi level. By taking this period sufficiently, it is possible to operate the second comparator 207 after charging of the output smoothing capacitor 125 is completed.

<Operation after Time Point g2>

Time after time point g2 corresponds to time from the operation of the second comparator 207 until the power supply apparatus 200 goes into steady operation. In the power supply apparatus 200, by taking the delay period sufficiently, the comparison output ($V_{SW}$) of the second comparator 207 is set to the Hi level after the output voltage ($V_A$) of the boosting converter 120 reaches the set voltage ($V_{SET}$) and the charging current of the output smoothing capacitor 125 becomes zero. As a result, the switch element 103 and the DCDC converter 115 are turned on.

At this time, since the output voltage ($V_A$) of the boosting converter 120 has reached the set voltage ($V_{SET}$), the charging current of the output smoothing capacitor 125 is zero. In addition, since the DCDC converter 115 is also off, the current flowing through the inrush current limiting element 102 is zero. Therefore, a secondary inrush current that occurs when the switch element 103 is short-circuited does not occur at all.

Since the DCDC converter 115 gradually starts drawing a current after the above, the input current $I_{IN}$ gradually increases, and the power supply apparatus 200 goes into the steady operation. Since the switch element 103 is on in steady operation, the input current ($I_{IN}$) is equal to the current ($I_{SW}$) flowing through the switch element 103 ($I_{IN}=I_{SW}$). In addition, the current ($I_R$) flowing through the inrush current limiting element 102 becomes zero ($I_R=0$). Therefore, there is no power consumption in the inrush current limiting element 102, and power loss by the inrush current limiting element 102 does not occur in steady operation.

As described above, in order to suppress various types of inrush currents, the power supply apparatus 200 according to the present embodiment short-circuits the inrush current limiting element 102 when no current flows in the inrush current limiting element 102, and suppresses a secondary inrush current while reducing unnecessary power consumption. Furthermore, the power supply apparatus 200 detects the inrush current that occurs at the time of return from the instantaneous interruption or the instantaneous drop, and suppresses the inrush current and the secondary inrush current by the same sequence as a sequence performed at power-on. In addition, in consideration of a variation in circuit elements that realize suppression of inrush currents as described above, a configuration that allows accurate control of the detection timing is employed. The configuration can suppress various inrush currents at higher accuracy.

<Circuit Configuration in Third Embodiment>

Figure 5:
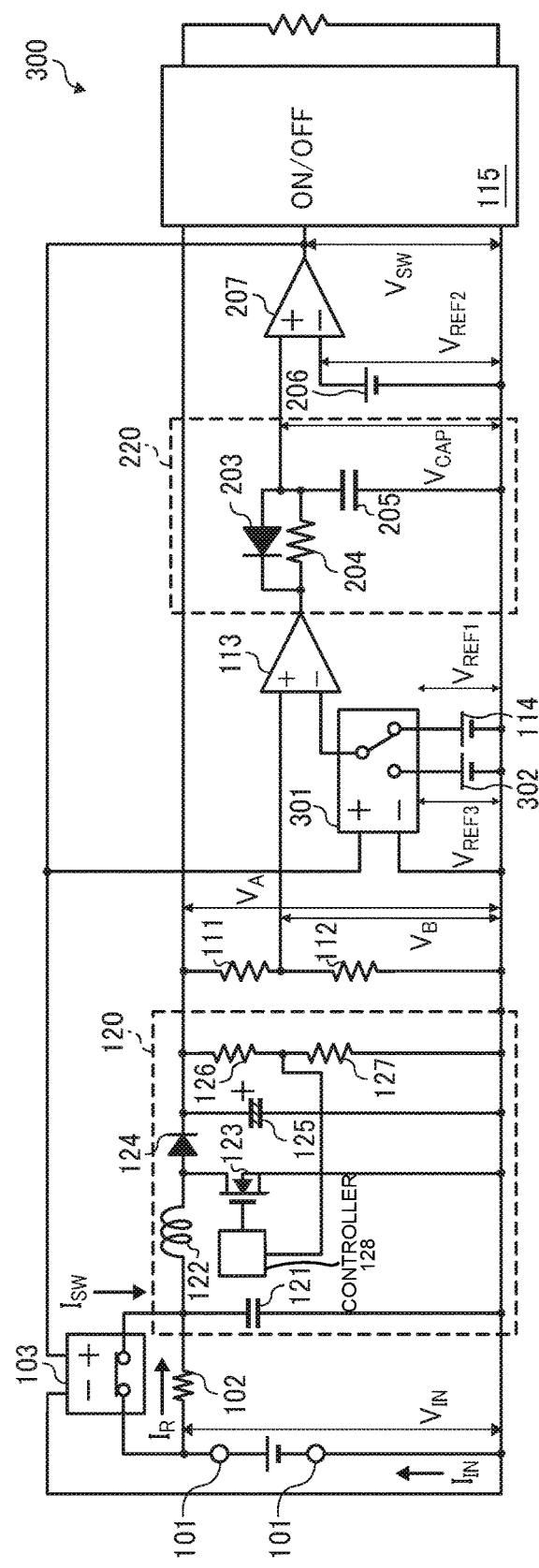
FIG. 5 is a circuit diagram illustrating a circuit configuration of a power supply apparatus according to a third embodiment of the present invention.
Figure 6:
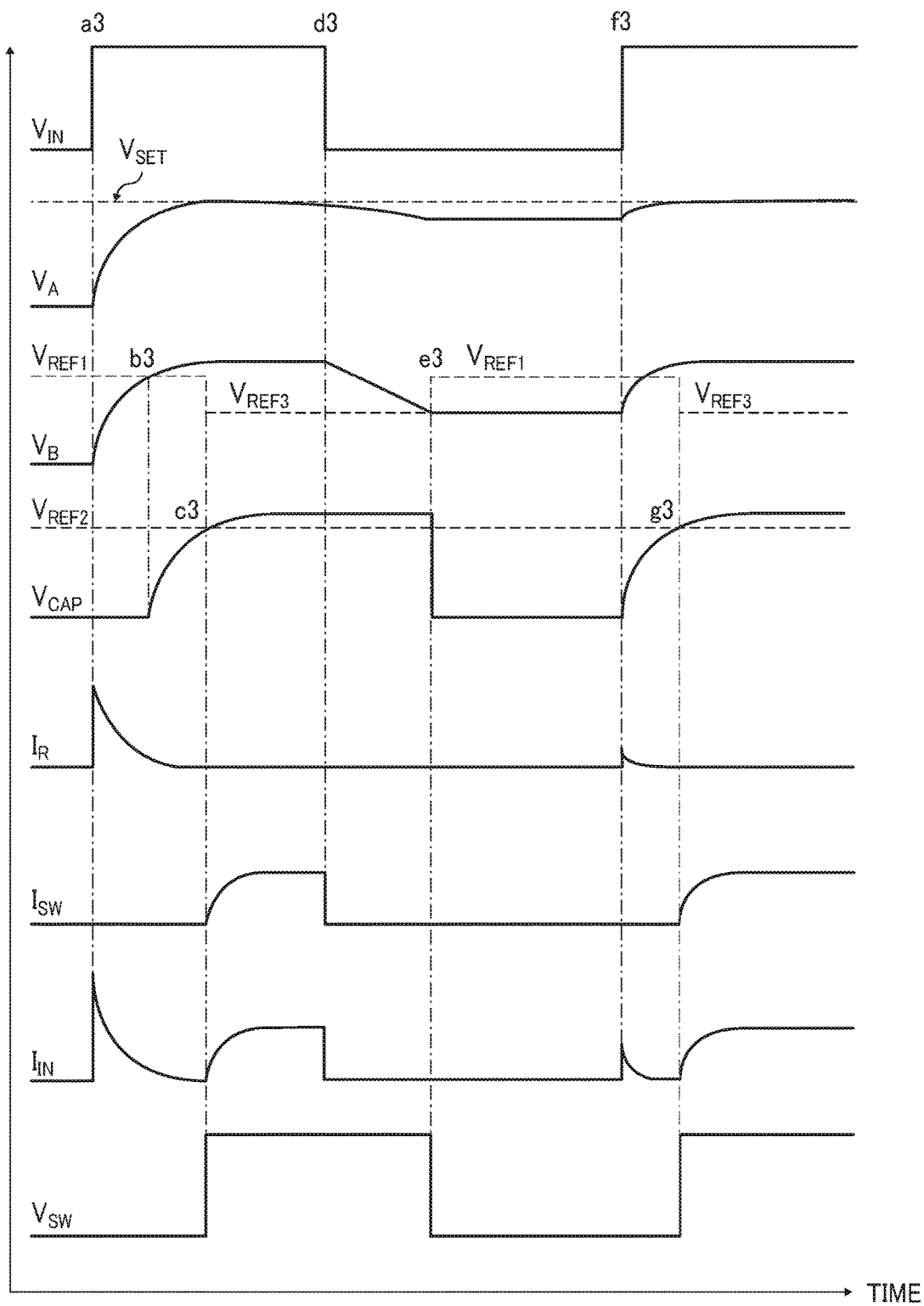
FIG. 6 is a timing chart for describing an operation sequence in the third embodiment.

Next, a power supply apparatus according to still another embodiment of the present disclosure will be described with reference to FIGS. 5 and 6. FIG. 5 is a circuit diagram illustrating the power supply apparatus according to the third embodiment of the present disclosure. In addition, FIG. 6 is a timing chart for describing an operation sequence of the power supply apparatus 300 according to the third embodiment.

Note that in the following description, the same configurations as the configurations described in the first embodiment and the second embodiment are denoted by the same reference signs, and detailed description of some of the configurations will be omitted. The power supply apparatus 300 according to the present embodiment includes the following configurations similarly to the power supply apparatus 100 according to the first embodiment.

That is, similarly to the power supply apparatus 100, the power supply apparatus 300 includes an input terminal 101, an inrush current limiting element 102, a switch element 103, a boosting converter 120, a first output voltage dividing resistor 111, a second output voltage dividing resistor 112, a comparator 113, a reference voltage source 114, and a DCDC converter 115.

Similarly to the power supply apparatus 200, the power supply apparatus 300 further includes a delay circuit 220 that controls an output timing of a signal output when an increase and a decrease in an output voltage ($V_A$) of the boosting converter 120 are detected, a second reference voltage source 206, and a second comparator 207.

Note that the delay circuit 220 is a circuit that generates a delay after detecting an increase in the output voltage ($V_A$) to output a signal, and then outputs a signal without giving a delay after detecting a decrease in the output voltage ($V_A$). The delay circuit 220 includes a time constant resistor 204, a time constant capacitor 205, and a capacitor discharging diode 203.

In addition to the above configuration, the power supply apparatus 300 further includes a second switch element 301 that gives a hysteresis characteristic to the detection of the output voltage ($V_A$) of the boosting converter 120, and a third reference voltage source 302. That is, the power supply apparatus 300 has a plurality of reference voltages.

In the power supply apparatus 300, a ripple (pulsating flow) occurs in the output voltage ($V_A$) of the boosting converter 120, depending on the load 116 coupled to the DCDC converter 115. In the power supply apparatus 200 described as the second embodiment, control is performed such that the increase in the output voltage ($V_A$) of the boosting converter 120 is detected, and the DCDC converter 115 and the switch element 103 are turned on with a delay. In such control, a ripple in the output voltage ($V_A$) may be detected. If the ripple is detected, a malfunction may be caused.

Accordingly, the power supply apparatus 300 according to the present embodiment is configured to switch between the reference voltage source 114 and the third reference voltage source 302 that detect an output of the boosting converter 120 and, by the switching, to give a hysteresis characteristic to a detection voltage and prevent a malfunction. Note that the second switch element 301 is of a switching contact type (C contact).

In the power supply apparatus 300, a voltage dividing circuit includes the first output voltage dividing resistor 111 and the second output voltage dividing resistor 112. A detection circuit that detects whether the output voltage ($V_A$) has reached the set voltage ($V_{SET}$) includes the voltage dividing circuit, the comparator 113, the delay circuit 220, the reference voltage source 114 or the third reference voltage source 302, the second comparator 207, and the second reference voltage source 206.

In addition, a control circuit in the power supply apparatus 300 includes the delay circuit 220, the second comparator 207, and the circuit that inputs the output voltage (signal) of the second comparator 207 to the switch element 103.

Note that in the detection circuit, switching of the reference voltage source 114 or the third reference voltage source 302 is performed in the second switch element 301.

<Circuit Operation in Third Embodiment>

Next, the operation and effects of the power supply apparatus 300 according to the present embodiment will be described. In FIG. 6, the horizontal axis represents passage of time. The vertical axis represents fluctuation of each voltage or each current described later. In FIG. 6, as in FIGS. 2 and 4, a predetermined position on the vertical axis does not represent a specific concrete numerical value (voltage value or current value). A plurality of waveforms arranged along the vertical axis corresponds to voltages or currents corresponding to reference signs specified in FIG. 5.

In FIG. 6, the present embodiment is similar to the first embodiment and the second embodiment with respect to a power supply voltage ($V_{IN}$), the output voltage ($V_A$) of the boosting converter 120, a divided voltage ($V_B$), a current ($I_R$) flowing through the inrush current limiting element 102, an input current ($I_{IN}$), a composite current of $I_R$ and $I_{IN}$ ($I_{SW}$), and a comparison output ($V_{SW}$).

In FIG. 6, the present embodiment is similar to the second embodiment with respect to the voltage across the time constant capacitor 205 ($V_{CAP}$) and the second reference voltage ($V_{REF2}$).

In FIG. 6, $V_{REF3}$ represents a third reference voltage to compare with the divided voltage ($V_B$) and, by the comparison, to detect a decrease in the output voltage ($V_A$) of the boosting converter 120.

Next, each timing used in FIG. 6 will be described. Time point a3 corresponds to the moment of power-on. Time point b3 corresponds to the moment when the boosting converter 120 reaches the first reference voltage ($V_{REF1}$). Time point c3 corresponds to the moment when the voltage across the time constant capacitor 205 ($V_{CAP}$) reaches the second reference voltage ($V_{REF2}$). Time point d3 corresponds to the moment when an instantaneous interruption or an instantaneous drop occurs in the power supply apparatus 300.

Time point e3 corresponds to the moment when the divided voltage ($V_B$) of the output voltage ($V_A$) of the boosting converter 120 falls below the first reference voltage ($V_{REF1}$) because of the instantaneous interruption or the instantaneous drop. Time point f3 corresponds to the moment when the power supply apparatus 300 returns from the instantaneous interruption or the instantaneous drop. Time point g4 corresponds to the moment when the voltage across the time constant capacitor 205 ($V_{CAP}$) reaches the second reference voltage ($V_{REF2}$) after return from the instantaneous interruption or the instantaneous drop.

<Operation at Time Point a3 to Time Point b3>

Time from time point a3 to time point b3 corresponds to time from when the power supply apparatus 300 is turned on until the output voltage ($V_A$) of the boosting converter 120 reaches the set voltage ($V_{SET}$). In the power supply apparatus 300, the output voltage ($V_A$) of the boosting converter 120 is zero just before the power is turned on (before time point a3). Therefore, the divided voltage ($V_B$) Of $V_A$ is also zero. When the divided voltage ($V_B$) is zero, the comparator 113 does not operate because there is no input to be compared, and the output of the comparator 113 becomes zero. In this case, the comparison output ($V_{SW}$) that is the output of the second comparator 207 also becomes zero. When the comparison output ($V_{SW}$) is zero, the switch element 103 does not operate. Therefore, a contact of the switch element 103 remains open. In addition, the DCDC converter 115 is also off.

Since the switch element 103 remains off at power-on (time point a3), the input current ($I_{IN}$) passes through the inrush current limiting element 102 from the input terminal 101 and charges the input capacitor 121 of the boosting converter 120. In addition, the input current ($I_{IN}$) passes through the inrush current limiting element 102, the coil 122, and the diode 124, and charges the output smoothing capacitor 125 of the boosting converter 120.

The inrush current that occurs at the time of this current application (time point a3) is suppressed by the inrush current limiting element 102. From time point a3 to time point b3, the output voltage ($V_A$) of the boosting converter 120 increases while the input current ($I_{IN}$) decreases. When time reaches time point b3, the output voltage ($V_A$) reaches the set voltage ($V_{SET}$) and the divided voltage ($V_B$) reaches the first reference voltage ($V_{REF1}$). At the same time, charging of the output smoothing capacitor 125 is completed and the input current ($I_{IN}$) becomes zero.

<Operation at Time Point b3 to Time Point c3>

Time from time point b3 to time point c3 corresponds to a period for giving a constant delay after the divided voltage ($V_B$) of the output voltage ($V_A$) of the boosting converter 120 reaches the first reference voltage $V_{REF1}$. When the divided voltage ($V_B$) exceeds the first reference voltage ($V_{REF1}$), the output of the comparator 113 becomes the Hi level. An output current from the comparator 113 passes through the time constant resistor 204 and charges the time constant capacitor 205 over time. When the voltage across the charged time constant capacitor 205 ($V_{CAP}$) exceeds the second reference voltage ($V_{REF2}$), the output of the second comparator 207 becomes the Hi level.

By ensuring this period sufficiently in accordance with the actual circuit operation, it is possible to operate the second comparator 207 after the output voltage ($V_A$) of the boosting converter 120 has reached the set voltage ($V_{SET}$), that is, after the charging of the output smoothing capacitor 125 is completed.

<Operation at Time Point c3 to Time Point d3>

Time from time point c3 to time point d3 corresponds to time from the operation of the second comparator 207 as described above until the power supply apparatus 300 goes into steady operation. By sufficiently taking the delay period already described, the comparison output ($V_{SW}$) that is the output of the second comparator 207 is set to Hi level after the output voltage ($V_A$) reaches the set voltage ($V_{SET}$). When the comparison output ($V_{SW}$) becomes the Hi level, the switch element 103 and the DCDC converter 115 are turned on.

At this time, since the output voltage ($V_A$) of the boosting converter 120 has reached the set voltage ($V_{SET}$), a charging current of the output smoothing capacitor 125 is zero. In addition, since the DCDC converter 115 is off until just before, the current flowing through the inrush current limiting element 102 is zero. Therefore, a secondary inrush current that occurs when the inrush current limiting element 102 is short-circuited by the switch element 103 does not occur at all.

At the same time, the second switch element 301 is operated to switch the reference voltage input to the comparator 113 to the third reference voltage ($V_{REF3}$). Note that the third reference voltage ($V_{REF3}$) is a voltage lower than the first reference voltage ($V_{REF1}$). As a result, a hysteresis characteristic can be given to the detection voltage that detects the output voltage ($V_A$) of the boosting converter 120, and a malfunction caused by detecting an output ripple voltage can be prevented.

After the above, the DCDC converter 115 gradually starts drawing a current. Therefore, the input current $I_{IN}$ gradually increases and the power supply apparatus 300 goes into steady operation. Since the switch element 103 is on (the contact is closed and the inrush current limiting element 102 is short-circuited) in steady operation, the input current ($I_{IN}$) is equal to the current ($I_{SW}$) flowing through the switch element 103 ($I_{IN}=I_{SW}$). In addition, the current ($I_R$) flowing through the inrush current limiting element 102 is zero ($I_R=0$). Therefore, in steady operation, the inrush current limiting element 102 does not consume power in the power supply apparatus 300.

<Operation at Time Point d3 to Time Point e3>

Time from time point d3 to time point e3 is a period from when an instantaneous interruption or an instantaneous drop occurs in the power supply apparatus 300 until the output voltage ($V_A$) of the boosting converter 120 decreases and the divided voltage ($V_B$) falls below the third reference voltage ($V_{REF3}$). Even if the instantaneous interruption or the instantaneous drop occurs, the DCDC converter 115 draws a current for supplying power to the load 116. Therefore, the boosting converter 120 supplies power to the DCDC converter 115 while power supply from the input terminal 101 is insufficient. At this time, since the output voltage ($V_A$) of the boosting converter 120 has decreased, the divided voltage ($V_B$) naturally becomes lower than the third reference voltage ($V_{REF3}$).

<Operation at Time Point e3 to Time Point f3>

Time from time point e3 to time point f3 corresponds to time from when the divided voltage ($V_B$) falls below the third reference voltage ($V_{REF3}$) until the power supply apparatus 300 returns from the instantaneous interruption or the instantaneous drop. In the power supply apparatus 300, when the divided voltage ($V_B$) falls below the third reference voltage ($V_{REF3}$), the comparator 113 stops outputting. When the output of the comparator 113 stops, the time constant capacitor 205 is instantaneously discharged via the capacitor discharging diode 203. Then, since the voltage across the time constant capacitor 205 ($V_{CAP}$) becomes zero, the comparison output ($V_{SW}$) that is the output of the second comparator 207 becomes the Low level. When the comparison output ($V_{SW}$) becomes the Low level, the switch element 103 and the DCDC converter 115 are turned off. At this point, since the second switch element 301 is also turned off, the reference input to the comparator 113 is switched from the third reference voltage ($V_{REF3}$) to the first reference voltage ($V_{REF1}$).

<Operation at Time Point f3 to Time Point g3>

Time from time point f3 to time point g3 is a period for giving a constant delay after return from the instantaneous interruption/instantaneous drop. After return from the instantaneous interruption/instantaneous drop, the divided voltage ($V_B$) exceeds the first reference voltage ($V_{REF1}$). Therefore, the output of the comparator 113 becomes the Hi level. At this time, the output current of the comparator 113 charges the time constant capacitor 205 over time via the time constant resistor 204. As a result, when the voltage across the time constant capacitor 205 ($V_{CAP}$) exceeds the second reference voltage ($V_{REF2}$), the comparison output ($V_{SW}$) that is the output of the second comparator 207 becomes the Hi level. By taking this period sufficiently, it is possible to operate the second comparator 207 after charging of the output smoothing capacitor 125 is completed.

<Operation after Time Point g3>

Time after time point g3 corresponds to time from the operation of the second comparator 207 until the power supply apparatus 300 goes into steady operation. In the power supply apparatus 300, by taking the delay period sufficiently, the comparison output ($V_{SW}$) of the second comparator 207 is set to the Hi level after the output voltage ($V_A$) of the boosting converter 120 reaches the set voltage ($V_{SET}$) and the charging current of the output smoothing capacitor 125 becomes zero. As a result, the switch element 103 and the DCDC converter 115 are turned on.

At this time, since the output voltage ($V_A$) of the boosting converter 120 has reached the set voltage ($V_{SET}$), the charging current of the output smoothing capacitor 125 is zero. Since the DCDC converter 115 is also off, the current flowing through the inrush current limiting element 102 is zero. Therefore, a secondary inrush current that occurs when the switch element 103 is short-circuited does not occur at all.

At the same time, the second switch element 301 is operated to switch the input reference voltage to the third reference voltage ($V_{REF3}$) lower than the first reference voltage ($V_{REF1}$). As a result, a hysteresis characteristic can be given to the detection voltage of the boosting converter 120, and a malfunction caused by detecting the output ripple voltage is prevented.

Since the DCDC converter 115 gradually starts drawing a current after the above, the input current $I_{IN}$ gradually increases, and the power supply apparatus 300 goes into the steady operation. Since the switch element 103 is on in steady operation, the input current ($I_{IN}$) is equal to the current ($I_{SW}$) flowing through the switch element 103 ($I_{IN}=I_{SW}$). In addition, the current ($I_R$) flowing through the inrush current limiting element 102 becomes zero ($I_R=0$). Therefore, there is no power consumption in the inrush current limiting element 102, and power loss by the inrush current limiting element 102 does not occur in steady operation.

As described above, in order to suppress various types of inrush currents, the power supply apparatus 300 according to the present embodiment short-circuits the inrush current limiting element 102 when no current flows in the inrush current limiting element 102, and suppresses a secondary inrush current while reducing unnecessary power consumption. Furthermore, the power supply apparatus 300 detects the inrush current that occurs at the time of return from the instantaneous interruption or the instantaneous drop, and suppresses the inrush current and the secondary inrush current by the same sequence as a sequence performed at power-on. In addition, as described above, two different reference voltages are used to detect the ripple of the output voltage ($V_A$) of the boosting converter 120. As a result, it is possible to reliably and stably suppress various inrush currents.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A power supply apparatus comprising:
   a DCDC converter electrically coupled to a load;
   a boosting converter configured to supply an output voltage to the DCDC converter;
   an inrush resistor configured to limit an inrush current from an input terminal to the boosting converter, the inrush resistor arranged in parallel with a switch that is configured to short-circuit the inrush resistor;
   a voltage dividing circuit configured to divide the output voltage of the boosting converter;
   a comparator configured to compare the divided output voltage to a reference voltage to detect whether the output voltage of the boosting converter has reached a predetermined voltage,
   wherein responsive to detecting that the output voltage of the boosting converter reaches the predetermined voltage, the comparator outputs a first signal to the switch and the DCDC converter that closes the switch to short-circuit the inrush resistor and turns on the DCDC converter,
   wherein responsive to an instantaneous voltage drop at the input terminal, the DCDC converter draws power from the boosting converter to decrease the output voltage of the boosting converter until the output voltage is below the predetermined voltage, and
   wherein responsive to detecting that the output voltage of the boosting converter is below the predetermined voltage as a result of the instantaneous voltage drop at the input terminal, the comparator outputs a second signal to the switch and the DCDC converter that opens the switch and turns off the DCDC converter.

2. The power supply apparatus according to claim 1, wherein immediately prior to the comparator outputting the first signal to close the switch and turn on the DCDC converter, a charging current to an output smoothing capacitor of the boosting converter is zero to prevent a secondary inrush current when the switch is thereafter short-circuited via the first signal.

3. The power supply apparatus according to claim 1 further comprising:
   a delay circuit including
   a second switch to switch between the reference voltage and another reference voltage according to a signal output from the comparator.

4. The power supply apparatus according to claim 1, further comprising:
   a delay circuit configured to delay and output a detection signal when the output voltage reaches the predetermined voltage, to operate the switch so as to delay and output the detection signal and the short-circuit of the inrush resistor.

* * * * *